United States Patent [19]

Ciprian et al.

[11] Patent Number: 5,735,485
[45] Date of Patent: Apr. 7, 1998

[54] VARIABLE SLOT AIRBRAKE FOR AIRCRAFT WING

[75] Inventors: Danilo Ciprian, Aussonne; Benoît Hemadou, Tournefeuille; Pascal Chaumel, Plaisance, all of France

[73] Assignee: Aerospatiale Societe Nationale Industrielle, Paris, France

[21] Appl. No.: 577,834

[22] Filed: Dec. 22, 1995

[30] Foreign Application Priority Data

Dec. 26, 1994 [FR] France .................. 94 15641

[51] Int. Cl.⁶ ...................................... B64C 9/02
[52] U.S. Cl. ...................... 244/113; 244/213; 244/217
[58] Field of Search ..................... 244/113, 129.1, 244/131, 110 D, 213, 215, 216, 217

[56] References Cited

U.S. PATENT DOCUMENTS

| | | | |
|---|---|---|---|
| 2,418,273 | 4/1947 | Moore | 244/113 X |
| 2,480,040 | 8/1949 | Mitchell | 244/113 X |
| 3,799,474 | 3/1974 | Scharzler | |
| 4,015,787 | 4/1977 | Maieli et al. | 244/113 X |

FOREIGN PATENT DOCUMENTS

| | | |
|---|---|---|
| 2 138 629 | 1/1973 | France. |
| 581876 | 10/1946 | United Kingdom. |
| 1 349 739 | 4/1974 | United Kingdom. |

*Primary Examiner*—William Grant
*Attorney, Agent, or Firm*—Michael N. Meller

[57] ABSTRACT

An airbrake located on the wing of an aircraft between a rear spar and a wing flap comprises two panels aligned with the upper surface of the wing when the airbrake is closed. In the open state or fully deployed position, the two panels are contiguous and behave as a single panel. However, in the intermediate states, the panel closest to the flap is deflected more than the other panel, so that a slot is formed between them. This slot makes it possible to significantly decrease turbulence on either side of the airbrake when the latter is used in low deflection flight.

13 Claims, 5 Drawing Sheets

VARIABLE SLOT AIRBRAKE FOR AIRCRAFT WING

BACKGROUND OF THE INVENTION

The invention relates to an airbrake designed for placing on the upper surface of an aircraft wing, between a rear spar of the wing and a wing flap articulated to the rear spar.

On aircraft, the airbrakes positioned between the rear spar of each of the wings and the wing flaps to the rear of the rear spar, in general, fulfill three different functions:

A first function is a deflection function making it possible for the flying aircraft to roll. This is accomplished by actuating the airbrakes on the two wings in an asymmetrical manner, with a relatively small deflection angle of e.g. approximately 11°. This function is generally called the spoiler function.

The second function fulfilled by airbrakes is a flight altitude loss function. It consists of actuating the airbrakes on the two wings in a symmetrical manner, with a high or low deflection angle of e.g. up to 60° as a function of the desired altitude loss speed. The separation of air created downstream of the airbrakes then leads to a reduction in the lift and an increase in the drag. This function is generally called the airbrake function.

The third function fulfilled by airbrakes relates to the braking of the aircraft on landing. It consists of ground actuation of the airbrakes on each of the wings in a symmetrical manner, with a maximum deflection angle. This third airbrake function is generally called the lift dumper function.

In the state of the art, each airbrake is in the form era single panel articulated to the rear spar of the corresponding wing. When the airbrake is in the inoperative state, the single, closed panel is located along the extension of the upper surface of the wing, so as to ensure continuity between the latter and the wing flaps. A limited deflection of the single panel constituting each airbrake can be carried out in flight either to ensure the spoiler function, or to ensure the airbrake function. In addition, a greater deflection of the single panel can take place either in flight, to ensure the airbrake function, or on the ground, to ensure the lift dumper function.

The existing airbrakes formed by a single panel perfectly fulfill the functions assigned to them under high deflection angles, simultaneously ensuring a significant decrease in lift and a significant increase in drag.

However, when the airbrakes formed by a single panel and without any slot are used with limited deflection angles, an area of separation is formed immediately to the rear of the airbrake leading to the creation of turbulence on either side of the airbrake. Such turbulence constitutes a serious disadvantage, particularly when the airbrakes are used in their spoiler function.

SUMMARY OF THE INVENTION

The invention specifically relates to an airbrake, whose original design makes it possible to fulfill the spoiler, airbrake, and lift dumper functions, while behaving like a single panel airbrake for high deflections and creating a slot in the case of low deflections. The slot varies according to the deflection angle, so that the area of separation to the rear of the airbrake is limited and consequently turbulence on either side of the airbrake is reduced.

According to the invention, this result is obtained by means of an airbrake for placing on an upper surface of an aircraft wing, between a rear spar of the wing and a wing flap. The airbrake comprises a first panel adjacent the rear spar and a second panel placed between the first panel and the wing flap, as well as inclination control means for mounting and actuating the airbrake such that the first panel and the second panel form a contiguous portion of the upper surface of the wing when the airbrake is closed, and the first panel and the second panel are at the same angle and form a contiguous surface when the airbrake is fully deployed, but the second panel is at a greater angle than the first panel intermediate the closed and fully deployed positions forming a slot between the first and second panels.

In a preferred embodiment of the invention, the positions intermediate the closed and the fully deployed positions consist of a very limited deflection state, in which the first panel is slightly deflected inwardly with respect to the upper surface of the wing, and a limited deflection state, in which the first panel is placed along the extension of the upper surface, and an average deflection state in which the first panel is deflected outwardly compared with the upper surface by a deflection angle lower than the deflection angle of the second panel.

As a function of the features which it is wished to give to the airbrake under high deflection angles, the edge of the first panel adjacent the rear spar can be displaced toward the outside of the wing compared with the upper surface, or placed substantially along the extension of the upper surface in the fully deployed position of the airbrake.

In a further preferred embodiment of the invention, the first panel and the second panel are pivotally installed on the rear spar by a first common axis or pin substantially parallel to the rear spar.

Moreover, if it is possible to actuate the two panels of the airbrake by completely separate control means, the inclination control means preferably act simultaneously on the first panel and on the second panel by the same control mechanism.

In this case, the control mechanism advantageously comprises at least one assembly having a pivoting part articulated to the rear spar by a second pin, a first rod articulated to the first panel by a third pin and to the pivoting part by a fourth pin, and a second rod articulated to the second panel by a fifth pin and to the pivoting part by a sixth pin, the second, third, fourth, fifth, and sixth pins being substantially parallel to the first common axis or pin. The first, second, third, fourth, and fifth pins are separate from one another.

The sixth pin may be separate from the other pins, or conversely, the fourth and sixth pins may be a single pin.

In the first case, the second pin is further removed from the upper surface of the wing than the first common pin and in the closed state of the airbrake, the second pin is located substantially between the third and fourth pins. The sixth pin is then displaced toward the wing flap and on moving away from the upper surface compared with the second pin.

Moreover, in the closed state of the airbrake, the second pin is slightly displaced toward the wing flap with respect to the plane containing the third and fourth pins. This feature makes it possible to precede the aforementioned limited deflection state by the very limited deflection state, in which the first panel is slightly deflected inwardly. Moreover, the fifth pin is significantly further removed from the common axis than the third pin.

In the preferred embodiment of the invention, the control mechanism comprises two assemblies of the type defined hereinbefore, which are displaced parallel to the rear spar of the wing and the inclination control means have an actuator placed between the two assemblies and connecting the trailing edge to the second panel.

BRIEF DESCRIPTION OF THE DRAWINGS

The preferred embodiment of the invention is described in greater detail hereinafter relative to the attached drawings, wherein show.

DESCRIPTION OF THE PREFERRED EMBODIMENTS

Figure 1:
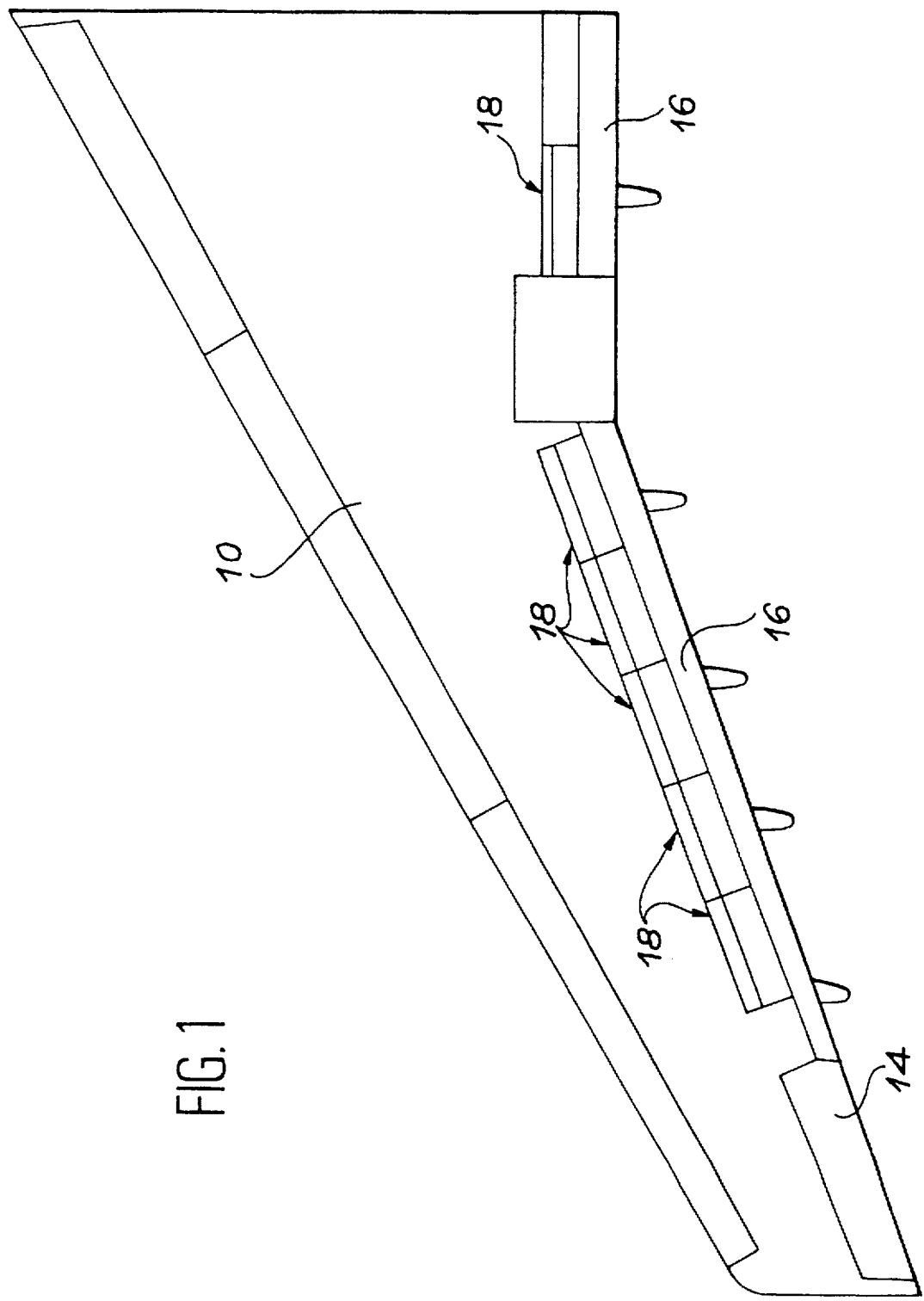
FIG. 1 is a plan view showing an aircraft wing equipped with airbrakes according to the invention.
Figure 3:
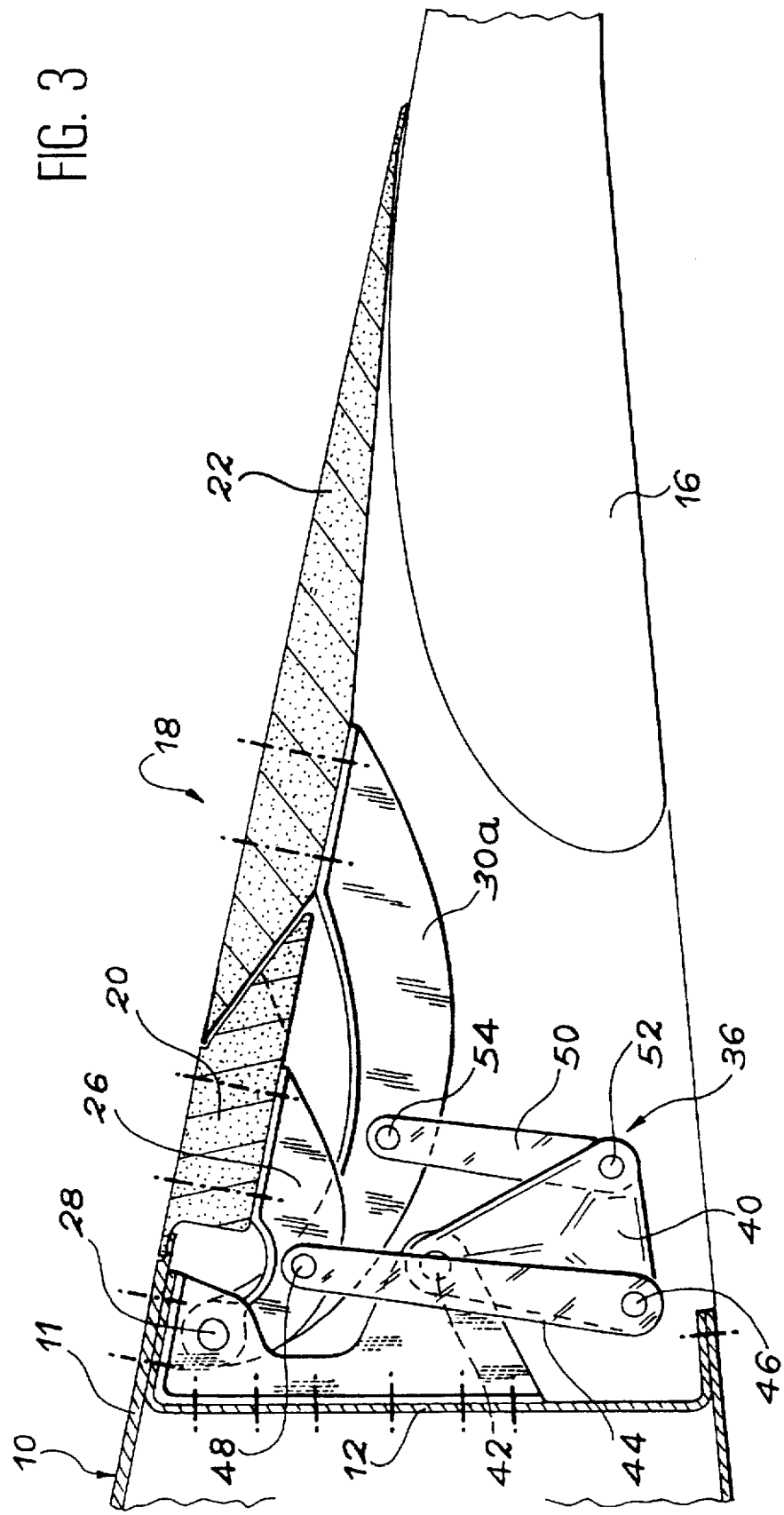
FIG. 3 is a cross-sectional view of the airbrake of FIG. 2, showing it in its closed state.
Figure 4:
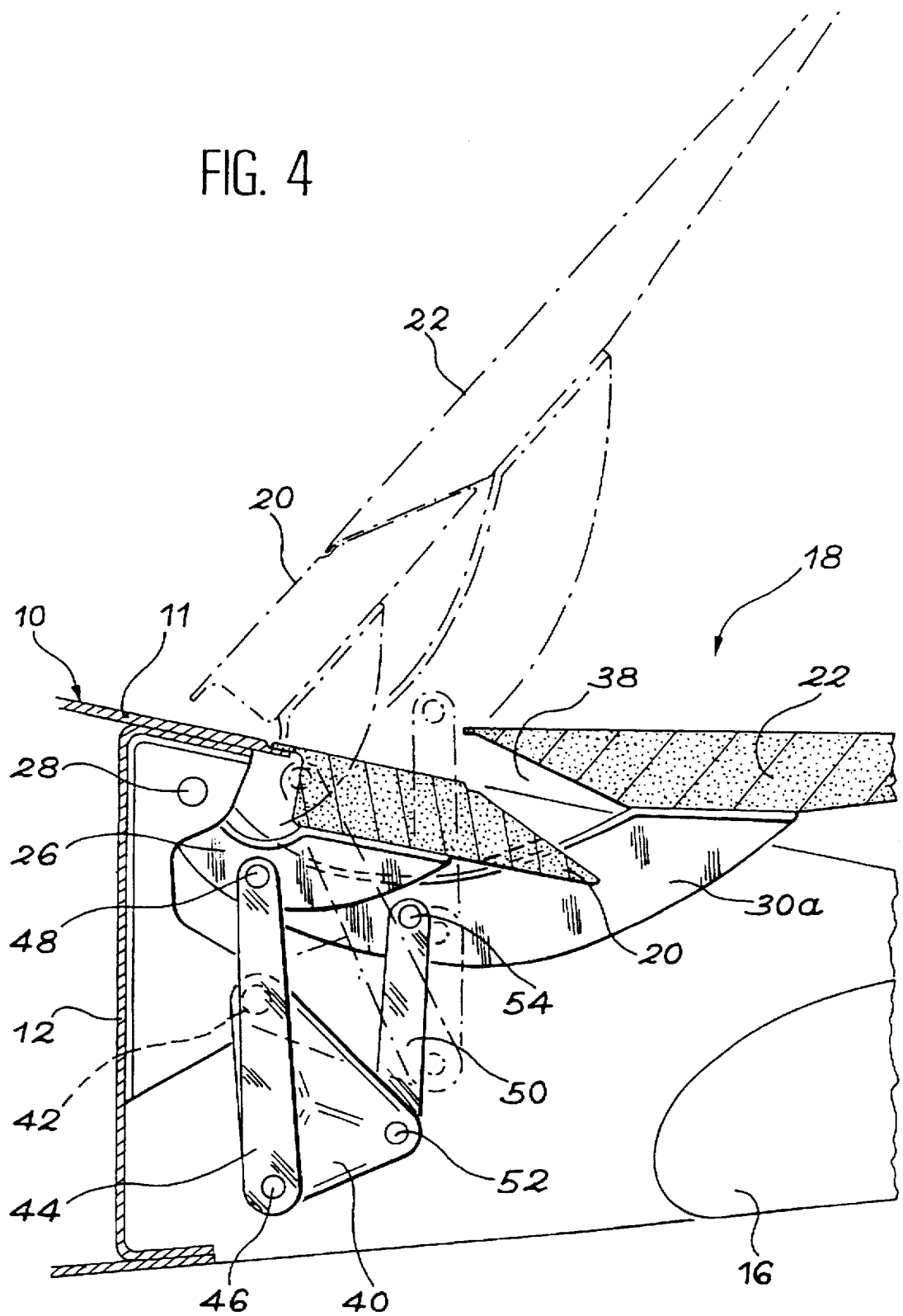
FIG. 4 is a sectional view, comparable to FIG. 3, illustrating in continuous line manner the airbrake in an intermediate state corresponding to limited deflection and, in broken line manner, the airbrake in its fully deployed state corresponding to high deflection.

FIG. 1 shows in plan view an aircraft wing, whose fixed structure is designated by the reference 10. This fixed structure 10 has a rear spar 12 (FIGS. 3 and 4). In the vicinity of the wing end, spar 12 supports in pivoting manner one or more ailerons 14 directed toward the trailing edge. On the remainder of the wing, the rear spar 12 supports in pivoting manner the wing flaps 16 also directed toward the trailing edge.

On the upper surface of the wing visible in FIG. 1, airbrakes 18 are interposed between the rear spar 12 and the wing flaps 16. According to the invention, these airbrakes 18 have an original structure, a preferred embodiment of which will now be described in greater detail relative to FIGS. 2 to 4.

Instead of comprising a single panel in the manner of existing airbrakes, the airbrakes 18 according to the invention have two panels 20, 22, articulated in each case to the rear spar 12 of the wing about a common axis 24 oriented substantially parallel to the rear spar.

More specifically, the first panel 20 of each of the airbrakes 18, interposed between the rear spar 12 and the second panel 22, is fixed in the vicinity of each of its ends to two pairs of arched supports 26. The ends of these arched supports 26 opposite to the first panel 20 are supported in pivoting manner by the rear spar 12 of the wing by means of two pivots 28 arranged along the common axis 24.

Moreover, the second panel 22, interposed on the upper surface of the wing between the first panel 20 and the wing flap 16, is fixed to the end of three arched supports 30a, 30b, regularly distributed along the entire length of the panel 22. The opposite ends of the arched supports 30a positioned in the vicinity of the ends of the panel 22 are mounted in pivoting manner on the pivots 28, between the arched supports 26 supporting the first panel 20. The arched support 30b placed in the center of the second panel 22 is mounted in pivoting manner by its opposite end on the rear spar 12 of the wing, by means of another, not show pivot arranged along the common axis 24.

The airbrake 18 also has means for controlling the inclination of the panels 20 and 22 making it possible to pass the airbrake from a closed state or position, illustrated in FIG. 3, to an open state or fully deployed position, illustrated in broken line form in FIG. 4. This is accomplished by passing through intermediate states, such as that illustrated in continuous line manner in FIG. 4. These inclination control means are designated in general form by the reference 32 of FIG. 2.

Figure 2:
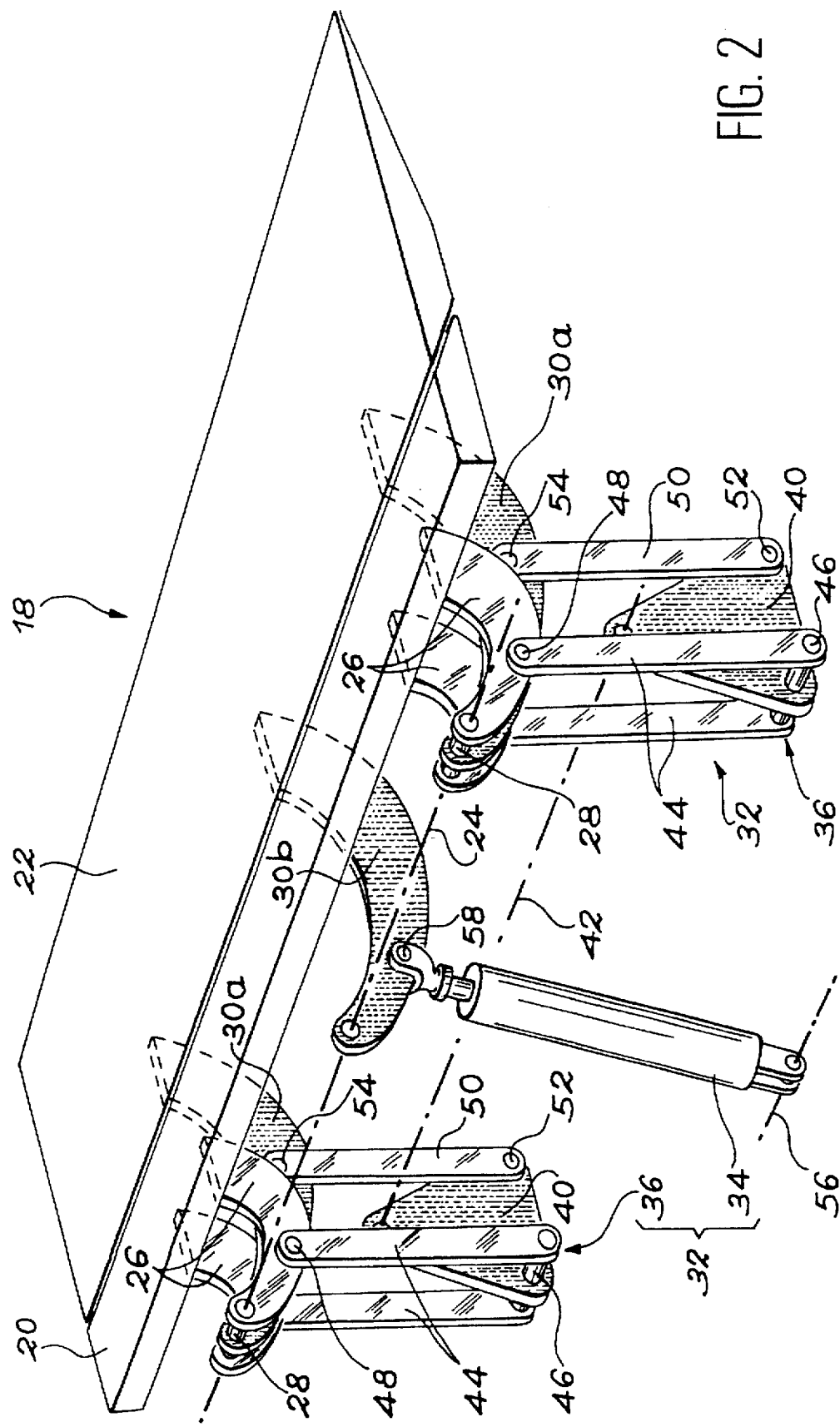
FIG. 2 is a perspective view illustrating on a larger scale one of the airbrakes equipping the wing of FIG. 1.

In the preferred embodiment, more particularly shown in FIG. 2, the inclination control means 32 for the panels 20, 22 of the airbrake 18 comprise a single actuator 34, as well as a control mechanism formed by two identical assemblies 36. As a result of this control mechanism, the action exerted by the actuator 34 leads to distinct, precise kinematics of each of the two panels 20 and 22 forming the active part of the airbrake 18.

The kinematics are such that, when the airbrake is in its closed state, the first panel 20 and the second panel 22 are joined and form a contiguous portion of the upper surface 11 of the fixed structure 10 of the wing. In such closed state of the airbrake 18, there is no slot between the fixed structure 10 of the wing, the panels 20, 22, and the wing flap 16. Thus, the continuity of the upper surface 11 of the wing is ensured.

The kinematics determined by the control mechanism of the panels 20, 22 is also such that when the airbrake 18 is in its open state or fully deployed position, illustrated in broken line form in FIG. 4 and which corresponds to a high deflection of the panels 20, 22 outwardly with respect to the upper surface 11 of e.g. approximately 60°, the panels 20 and 22 also form a contiguous surface so as to ensure a maximum aerodynamic braking.

In the embodiment illustrated in FIG. 4, in the open state of the airbrake, the edge of the first panel 20 adjacent the rear spar 12 of the fixed part of the wing is displaced outwardly of the latter compared with the upper surface 11.

However, this arrangement must not in any way be considered limiting. Thus, in the open state of the airbrake 18, the kinematics defined by the control mechanism can also be such that the edge of the panel 20 adjacent the rear spar 12 is located substantially along the extension of the upper surface 11. This result can be obtained by rearwardly displacing the common axis 24 of the panels 20 and 22.

Finally and as illustrated in continuous line manner in FIG. 4, the kinematics defined by the control mechanism of the airbrake 18 is such that between the closed and open states of the airbrake, the latter passes through intermediate states or positions in which the first panel 20 remains substantially in the position which it occupies in the closed state, whereas the second panel 22 is deflected outwardly by a relatively small angle of e.g. approximately 11°. Under these conditions, between the first panel 20 and the second panel 22, there is a slot 38 making it possible to maintain a laminar flow of the air which prevents or reduces to a significant extent the formation of turbulence on either side of the airbrake. The width of the slot varies as a function of the deflection angle of the second panel 22.

As is illustrated in FIG. 2, the hydraulic actuator or jack 34 ensuring the deflection control of the panels 20 and 22 is interposed between the rear spar 12 and the arched support 30b fixed in the center of the second panel 22. More specifically, a first end of the actuator 34 is articulated on the rear spar 12 by a pin 56 and the other end of the actuator 34 is articulated on the central, arched support 30b by a pin 58. These pins 56 and 58 are parallel to the pivot pin 24. The pin 56 is downwardly and forwardly displaced with respect to the pivot pin 24 of the panels.

In the preferred embodiment, each of the two assemblies 36 constituting the control mechanisms of the panels 20 and 22 is located in the vicinity of the ends of such panels and is interposed between the rear spar 12 of the fixed part of the wing and the arched supports 26 and 30a respectively fixed to the first and second panels 20 and 22.

As these two assemblies 36 are identical, only one of them will now be described with reference to FIGS. 2 to 4.

Each assembly 36 firstly comprises a pivoting part 40, which is e.g. triangular. This pivoting part 40 is articulated to the rear spar 12 by an axis or pin 42 parallel to the common axis 24 of the panels 20, 22 and moved away from the upper surface 11 with respect to the axis 24. The pivot pin 42 of the pivoting part 40 on the rear spar 12 is also slightly displaced toward the wing flap compared with the common axis 24 of the panels, 20, 22.

The assembly 36 also has a first rod 44 (double in the embodiment shown in FIG. 2), which connects the pivoting part 40 to the first panel 20. More specifically, a first end of the rod 44 is articulated to the pivoting part 40 by a first pin 46 parallel to the pins 24 and 42. The other end of the first rod 44 is articulated to the arched supports 26 fixed to the first panel 20 by a pin 48 which is also parallel to the pins 24 and 42. The pin 48 is substantially aligned with the pivot pin 58 of the actuator 34 on the arched support 30b (FIG. 2).

As illustrated in FIG. 3, in the closed state of the airbrake 18, the pins 46 and 48 are located on either side of the pin 42 and the latter is located in the immediate vicinity of a plane passing through the pins 46 and 48. More specifically, the pin 42 is then slightly displaced toward the wing flap 16 with respect to said plane, which is itself substantially perpendicular to the upper surface 11.

As a result of this arrangement, a limited pivoting of the part 40 about its pin 42, in an anticlockwise direction from the closed state of the airbrake, has essentially no effect on the first panel 20. Thus, the pin 42 firstly approaches the plane passing through the pins 46 and 48 before progressively moving away therefrom.

This is the reason why, in the intermediate position of the panels 20 and 22, illustrated in continuous line manner in FIG. 4 and called the low deflection position, the panel 20 occupies the same position as in its closed state illustrated in FIG. 3.

Before arriving at this low deflection position, the airbrake passes through a very low deflection state, in which the first panel 20 is slightly deflected inwardly with respect to the upper surface 11. This very low deflection state includes the position in which the three pins 42, 46, and 48 are in the same plane.

The very low deflection state is followed by the low deflection state, illustrated in continuous line form in FIG. 4, in which the first panel is precisely in the position which it occupied in the closed state of FIG. 3. The latter state is followed by an average deflection state, in which the first panel 20 progressively is deflected outwardly, as a result of the plane passing through the pins 46 and 48 ever more rapidly moves away from the pin 42 of the pivoting part 40.

Each of the assemblies 36 also comprises a second rod 50, interposed between the pivoting part 40 and the second panel 22. A first end of said second rod 50 is articulated to the pivoting part 40 by a pin 52 and its opposite end is articulated to the arched support 30a by a pin 54. The pins 52 and 54 are parallel to one another and to the pins 24, 42, 46, and 48. Each of the pins is also substantially parallel to the rear spar 12.

The distance separating the pin 54 from the common pin 24 of the panels is significantly greater (e.g., approximately double) that separating the pin 48 from the common pin 24 (see FIG. 4).

In section, the pins 42, 46, and 52 form a substantially equilateral triangle, the pin 52 being rearwardly displaced with respect to the plane containing the pins 42 and 46 in the closed state of the airbrake illustrated in FIG. 3. In said same state, the plane passing through the pins 52 and 54 is substantially parallel to the plane passing through the pins 46 and 48.

As a result of this arrangement, a counterclockwise pivoting of the part 40 about its pin 42, as from the closed state of the airbrake, has the immediate effect of deflecting the second panel 22 outwardly with respect to the upper surface 11. This explains why in the intermediate state illustrated in continuous line form in FIG. 4 and previously referred to as the low deflection state, the second panel 12 is deflected by an equal angle of e.g. approximately 11° relative to the upper surface 11, whereas the first panel 20 remains aligned with the upper surface.

When the counterclockwise pivoting of the part 40 continues, the deflection of the second panel 22 increases in a relatively regular manner. However, due to the fact that the pin 54 is further removed from the pivot pin 24 of the panels than the pin 48, the deflection of the first panel 20 then takes place faster. Consequently the first panel 20 rejoins the second panel 22 to form a contiguous surface for a deflection angle corresponding to the maximum deflection or fully deployed position of the airbrake, e.g. of approximately 60°. In the fully deployed position of the airbrake, illustrated in broken line form in FIG. 4, the adjacent edges of the panels 20 and 22 then substantially come into contact with one another to form a contiguous surface, so that the slot 32 which existed between the panels in the intermediate states of the airbrake is eliminated.

It should be noted that the adjacent edges of the panels 20 and 22 defining between them the slot 38 in the intermediate airbrake states, are inclined or beveled edges, so as to define a slot 38 oriented toward the rear from the upper surface 11, extended by the outer face of the first panel 20.

When the actuator 34 is actuated, it acts directly on the second panel 22 by means of the central, arched support 30b. The pivoting movement of the second panel 22 controlled by the actuator is transmitted to the parts 40 by the rods 50. Such movement is consequently transformed into a pivoting movement of the parts 50 about their pin 42, in a counterclockwise direction in the drawings. The pivoting of the parts 40 is in turn transmitted to the first panel 20 by the rods 44 articulated on the arched supports 26. The relative positions of the different pins determine the kinematics described in detail hereinbefore. In such kinematics, the closed state of the airbrakes 18 corresponds to normal aircraft flight conditions.

The intermediate states of the airbrakes 18, such as the low deflection state, illustrated in continuous line form in FIG. 4, can be used in flight either for the spoiler function, or for the airbrake function. In both cases, the presence of the slot 38 avoids excessive airflow separations particularly on either side of the airbrake. The turbulence which generally occurs under these conditions with existing airbrakes is consequently eliminated or greatly reduced.

Finally, the open state or fully deployed position of the airbrakes 18, illustrated in broken line form in FIG. 4, can be used either on the ground in the lift dumper function, or in flight in the airbrake function, the two panels 20 and 22 then behaving like a single panel, which ensures full airbrake efficiency.

Obviously, the invention is not limited to the embodiment described in exemplified manner hereinbefore. Thus, it is clear that the two airbrake panels can be controlled in a completely separate manner by separate control means so as to permit the obtaining of the desired kinematics. The control mechanism described can also be replaced by any technically equivalent mechanism also satisfying the described kinematics. From this standpoint and as indicated hereinbefore, it should be noted that the airbrake according to the invention can have, as desired, a small slot between the first panel and the upper surface or no slot in the airbrake open state. It should also be noted that the angles corresponding to the intermediate and open states can be modified at random by acting on the coordinates of the different axes or pins. Thus, the very low deflection state, in which the first panel is slightly deflected toward the interior of the wing can be eliminated, e.g. by placing the pin 42 in alignment with the pins 46 and 48, or by displacing the pin 42 toward the rear spar 12, in the closed state of the airbrake on using the described control mechanism.

Figure 5:
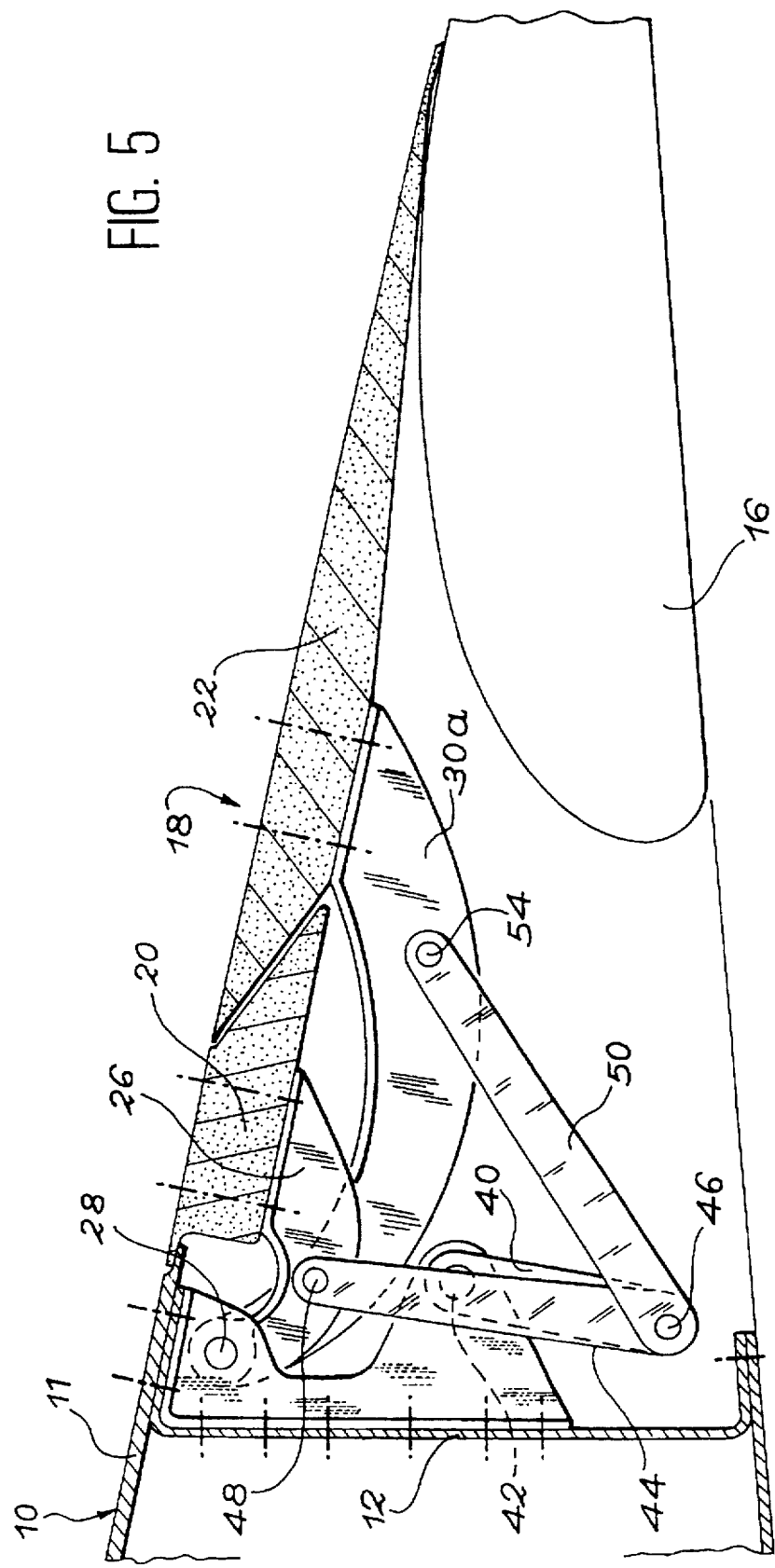
FIG. 5 is a sectional view, comparable to FIG. 3, illustrating a variant of the invention.

FIG. 5 also illustrates a variant of the control mechanism for the two panels of the wing flap. To facilitate understanding, members identical or comparable to those of the embodiment of FIGS. 1 to 4 are given the same references here. The variant of FIG. 5 essentially differs from the embodiment described hereinbefore through the fact that its pins 46 and 52 coincide. In other words, the two rods 44 and 50 are articulated to the part 40 by a common pin 46. Therefore, instead of being triangular, the part 40 is shaped as a simple lever. Under these conditions, the kinematics of the second panel 22 of the wing flap are ensured by rearwardly displacing the pin 54 by which the second panel is articulated to the rod 50.

We claim:

1. An airbrake adapted to be mounted along the upper surface of an aircraft wing, between a rear spar of the wing and a wing flap, said airbrake comprising a first panel adjacent said rear spar, a second panel between the first panel and the wing flap, and inclination control means for mounting and actuating the airbrake such that the first panel and the second panel form a contiguous portion of the upper surface of the wing when the airbrake is in a closed position and the first panel and the second panel are at the same angle and form a contiguous surface when the airbrake is in a fully deployed position but the second panel is at a greater angle than the first panel intermediate the closed and fully deployed positions forming a slot between said first and second panels.

2. The airbrake according to claim 1, wherein intermediate states are formed between said closed and fully deployed positions and comprise a very low deflection state, in which the first panel is slightly deflected inwardly with respect to the upper surface, a low deflection state, in which the first panel is an extension of the upper surface, and an average deflection state, in which the first panel is deflected outwardly relative to the upper surface by an angle smaller than the deflection angle of the second panel.

3. The airbrake according to claim 1, wherein, in the fully deployed position of the airbrake, one edge of the first panel adjacent to the rear spar is offset outwardly with respect to the upper surface.

4. The airbrake according to claim 1, wherein, in the fully deployed position of the airbrake, one edge of the first panel adjacent the rear spar is substantially an extension of the upper surface.

5. The airbrake according to claim 1, wherein the first panel and the second panel are pivotally mounted on the rear spar by a first common pin substantially parallel to the rear spar.

6. The airbrake according to claim 5, wherein the inclination control means simultaneously acts on the first panel and the second panel via a common control mechanism.

7. The airbrake according to claim 6, wherein the control mechanism comprises at least one assembly having a pivoting part articulated to the rear spar by a second pin, a first rod articulated to the first panel by a third pin and to the pivoting part by a fourth pin, and a second rod articulated to the second panel by a fifth pin and to the pivoting part by a sixth pin, the second, third, fourth, fifth and sixth pins being substantially parallel to the first common pin.

8. The airbrake according to claim 7, wherein the first, second, third, fourth, fifth and sixth pins are separated from one another.

9. The airbrake according to claim 8, wherein the second pin is more remote from the upper surface than the first common pin and wherein, in the closed state of the airbrake, the second pin is located substantially between the third pin and the fourth pin, the sixth pin then being offset towards the wing flap and remote from the upper surface with respect to the second pin.

10. The airbrake according to claim 9, wherein in the closed state of the airbrake, the second pin is slightly offset towards the wing flap with respect to a plane containing the third pin and the fourth pin.

11. The airbrake according to claim 7, wherein the first, second, third, fourth and fifth pins are separate from one another, the fourth and sixth pins forming a single pin.

12. The airbrake according to claim 7, wherein the fifth pin is more remote from the common pin than the third pin.

13. The airbrake according to claim 7, wherein the control mechanism comprises two assemblies offset substantially parallel to the rear spar, the inclination control means further comprising an actuator positioned between said two assemblies and connecting the rear spar to the second panel.

* * * * *